A. M. COSTON.
COMBINED LISTING-PLOW AND SEED-DRILL.
No. 180,553.  Patented Aug. 1, 1876.
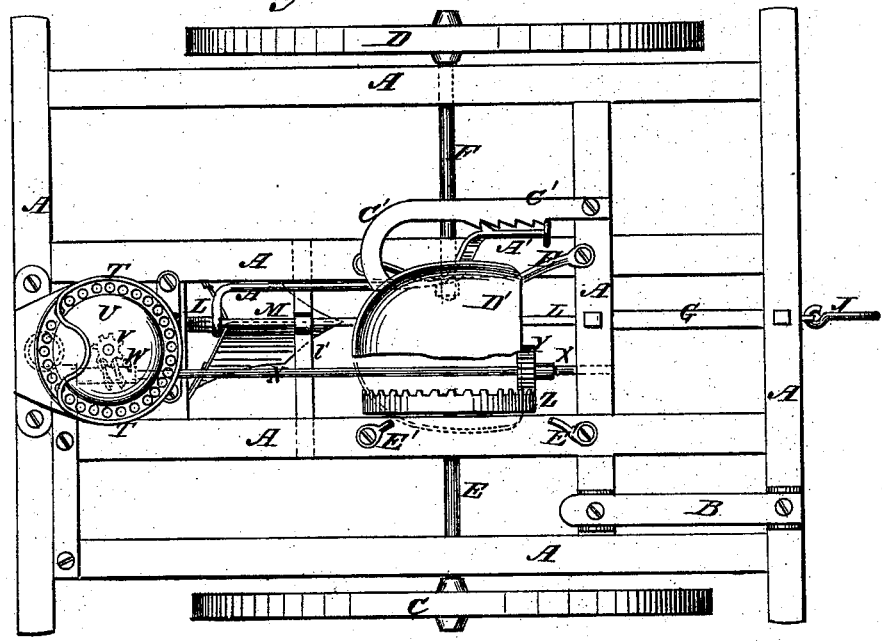
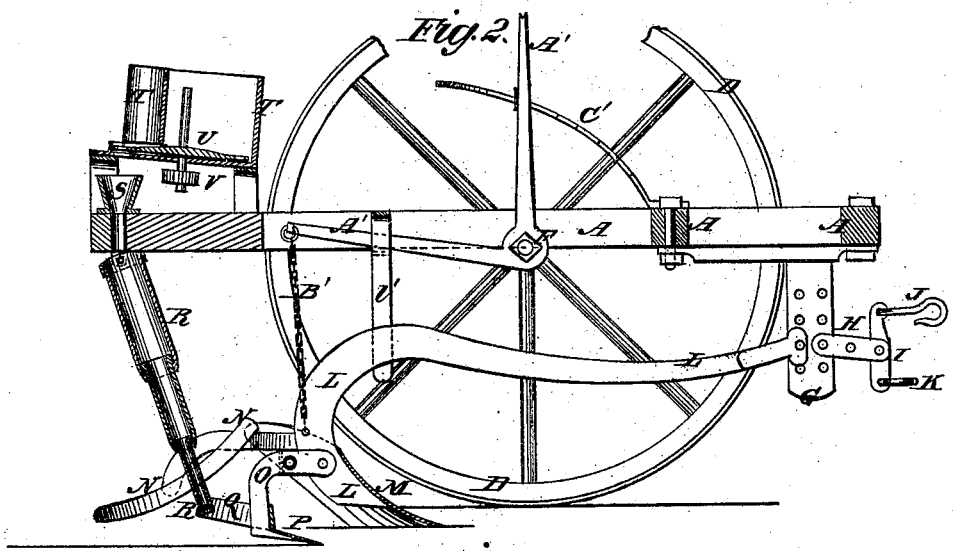
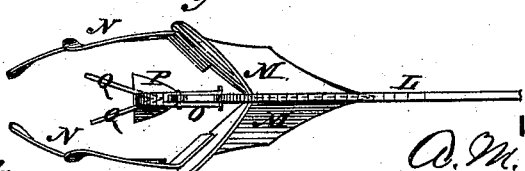
WITNESSES:
Francis McArdle
John Goethals
INVENTOR:
A. M. Coston
BY
Munn & Co.
ATTORNEYS.

UNITED STATES PATENT OFFICE.

ALONZO M. COSTON, OF MARYVILLE, MISSOURI.

IMPROVEMENT IN COMBINED LISTING-PLOWS AND SEED-DRILLS.

Specification forming part of Letters Patent No. 180,553, dated August 1, 1876; application filed April 25, 1876.

*To all whom it may concern:*

Be it known that I, ALONZO M. COSTON, of the city of Maryville, county of Nodaway, and State of Missouri, have invented a new and Improved Combined Listing-Plow and Seed-Drill, of which the following is a specification:

Figure 1 is a top view of my improved machine, part being broken away to show the construction. Fig. 2 is a vertical longitudinal section of the same. Fig. 3 is a detailed view of the same.

The object of this improvement is to furnish an improved machine for preparing the ground and planting the seed at one passing over the ground, the ground being left in a deep furrow and a ridge alternately, the subsoiler running in the rear of the main plow, thereby loosening the soil in the bed of the furrow, forming a suitable place to deposit the seed, dropping the seed and covering it, and which shall be simple in construction, convenient in use, effective in operation, and of light draft.

The invention consists in the construction and combination of parts, which will be hereinafter more fully described and then pointed out in the claim.

A is the frame of the machine, to the forward part of which, near one side, is attached the tongue B. C D are the wheels, one of which, C, is rigidly attached to its axle E, which revolves in bearings attached to the frame A. The other, D, revolves upon the journal of its axle F, which is attached to the frame A. To the forward part of the frame A is attached a hanger, G, which has two vertical rows of holes formed in it, the forward row being designed to receive a short coupling-bar, H, to the forward end of which is pivoted a short upright lever, I, having a hook, J, connected with its upper end, and a ring, K, with its lower end. This construction enables the point of draft-attachment to be adjusted higher or lower, as may be desired. The rear row of holes in the hanger G is designed to receive the bolt by which the forward end of the plow-beam L is pivoted adjustably to said hanger, so that the forward end of the plow-beam may be adjusted higher or lower, to cause the plow to work shallower or deeper in the ground, as may be desired. The plow-beam L passes back through the slot of the guide-hanger l', attached to the frame A, to keep the plow in line with the length of the machine, while allowing it to move up and down freely. The rear end of the beam L is curved downward and forward, so as to pass into the angle of the plow M, to which it is bolted or otherwise firmly secured. The plow M consists of two mold-boards and two shares, cast in one piece, and arranged at such an angle with each other as to turn half of the furrow to one side and half to the other. To the rear parts of the mold-boards of the plow M are attached wings or narrow curved plates N, which project to the rearward, and are curved inward, to serve as scrapers for covering the seed. To the end of the beam L is attached an arm, O, which projects to the rearward, and is bent downward to serve as a standard for the small plow P, that opens a channel to receive the seed. The standard O is made of such a length that the plow P may be far enough below the bottom of the plow M to open a channel of the proper depth in the bottom of the furrow made by the said plow M. To the lower part of the standard O are attached two lugs or short arms, Q, to and between the ends of which is pivoted the end of the conductor-spout R, so as to introduce the seed into the channel opened by the plow P before it has been partially filled by the falling in of the soil. The conductor-spout R is made of different lengths or parts, which slide into each other in the manner of a telescope, so that it may adjust itself in length as the plow moves up and down, to accommodate itself to the inequalities of the surface of the ground, and as the plow is raised from the ground. The upper end of the spout R is pivoted to the frame A in such a position as to receive the seed from the funnel S, that is attached to the frame A in such a position as to receive the seed from the discharge-holes of the dropping-wheel. T is the seed-hopper, which is supported at such a distance above the frame A as will allow space for the driving mechanism of the dropping plate or wheel U, which rests upon and is pivoted to the bottom of the seed-hopper T. In the wheel U, near its rim, is formed a circle of holes to receive the seed and drop it, through a hole in the bottom of the hopper T, into the funnel S. In one side of the hopper T is formed an inward bend, to leave uncovered that portion of the dropping-wheel U that is over the discharge-hole in the hopper-bottom, so that no more seed can escape into said discharge-hole than is contained in the holes of the said dropping-wheel. To the lower end of the pivot of the dropping-wheel U is attached a screw-wheel, V, into the teeth of which meshes the endless screw W, formed upon or attached to the rear part of the shaft X. The shaft X revolves in bearings attached to the frame A, and to its forward part is attached a small gear-wheel, Y, the teeth of which mesh into the teeth of a larger gear-wheel, Z, attached to the inner end of the revolving axle E of the wheel C. The bearings of the shaft X should be so arranged that the said shaft may be moved laterally by a lever connected with it, to throw the screw W into and out of gear with the screw-wheel V. To the inner end of the stationary axle F of the other wheel D is pivoted a bent lever, A', at its angle. The lower arm of the lever A' projects to the rearward, and to its end is attached the upper end of a short chain, B', the lower end of which is attached to the rear part of the plow-beam L, so that, by operating the said lever A', the plow can be raised from or lowered to and adjusted to work at any desired depth in the ground.

The lever A' is held in any position into which it may be adjusted by catching upon the teeth of the curved bar C', the ends of which are attached to the frame A.

D' is the driver's seat, the standards E' of which are attached to the frame A.

Having thus described my invention, what I claim as new, and desire to secure by Letters Patent, is—

The combination of the pivoted telescopic delivery-spout R and the arms Q with the subsoil-plow O P and vertically-adjustable furrowing-plow L M, as and for the purpose set forth.

ALONZO M. COSTON.

Witnesses:
W. M. COSTON,
J. L. JUNE.